United States Patent
Do

(10) Patent No.: US 9,422,825 B2
(45) Date of Patent: Aug. 23, 2016

(54) GAS TURBINE ENGINE SYNCHRONIZATION RING

(71) Applicant: United Technologies Corporation, Hartford, CT (US)

(72) Inventor: Logan H. Do, Canton, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 927 days.

(21) Appl. No.: 13/668,683

(22) Filed: Nov. 5, 2012

(65) Prior Publication Data

US 2014/0314540 A1 Oct. 23, 2014

(51) Int. Cl.
| F01D 17/14 | (2006.01) |
| F04D 29/56 | (2006.01) |
| F02C 9/20 | (2006.01) |
| F01D 17/16 | (2006.01) |
| F02C 9/22 | (2006.01) |

(52) U.S. Cl.
CPC ............. *F01D 17/14* (2013.01); *F01D 17/162* (2013.01); *F02C 9/20* (2013.01); *F02C 9/22* (2013.01); *F04D 29/563* (2013.01); *Y02T 50/672* (2013.01)

(58) Field of Classification Search
CPC ............. F02C 9/20; F02C 9/22; F01D 17/14; F01D 17/162; F04D 29/563; Y02T 50/672
USPC ............... 415/1, 148, 159, 149.2, 149.4, 150, 415/160–162
See application file for complete search history.

(56) References Cited

U.S. PATENT DOCUMENTS

| 2,819,732 A | * | 1/1958 | Paetz | F01D 17/162 |
| | | | | 138/46 |
| 3,099,433 A | * | 7/1963 | Wagner | F02C 9/22 |
| | | | | 415/149.3 |
| 3,736,070 A | * | 5/1973 | Moskowitz | F01D 17/16 |
| | | | | 415/147 |
| 3,841,788 A | * | 10/1974 | Sljusarev | F01D 17/162 |
| | | | | 415/147 |
| 4,130,375 A | | 12/1978 | Korta | |
| 4,812,106 A | | 3/1989 | Purgavie | |
| 4,836,746 A | | 6/1989 | Owsianky | |
| 4,867,635 A | | 9/1989 | Tubbs | |
| 5,035,572 A | | 7/1991 | Popp | |
| 5,549,448 A | | 8/1996 | Langston | |

(Continued)

FOREIGN PATENT DOCUMENTS

| DE | 3913102 | 5/1990 |
| EP | 2206891 | 7/2010 |

(Continued)

OTHER PUBLICATIONS

International Preliminary Report on Patentability for PCT/US2013/066998 mailed date of May 14, 2015.

(Continued)

*Primary Examiner* — Ninh H Nguyen
*Assistant Examiner* — Jesse Prager
(74) *Attorney, Agent, or Firm* — Carlson, Gaskey & Olds, P.C.

(57) ABSTRACT

A synchronization ring for a gas turbine engine according to an exemplary aspect of the present disclosure includes, among other things, a synchronization ring for a variable vane assembly. A plurality of rollers are attached to the synchronization ring for engaging a case on the gas turbine engine.

16 Claims, 4 Drawing Sheets

(56) References Cited

U.S. PATENT DOCUMENTS

| | | |
|---|---|---|
| 7,588,415 B2 | 9/2009 | Giaimo et al. |
| 7,677,866 B2 | 3/2010 | Bromann |
| 7,938,620 B2 * | 5/2011 | Bouru .................. F01D 17/162 415/160 |
| 8,092,157 B2 | 1/2012 | McCaffrey |
| 8,235,655 B1 | 8/2012 | Pankey et al. |
| 8,591,173 B2 | 11/2013 | Bouru et al. |
| 2005/0106010 A1 | 5/2005 | Evans |
| 2007/0292264 A1 | 12/2007 | Bouru |
| 2010/0021285 A1 | 1/2010 | Rowe et al. |

FOREIGN PATENT DOCUMENTS

| | | |
|---|---|---|
| FR | 2936559 | 4/2010 |
| GB | 2210108 | 6/1989 |
| JP | 2004124797 | 4/2004 |

OTHER PUBLICATIONS

International Search Report & Written Opinion for PCT/US2013/066998 completed on Feb. 11, 2014.

The Extended European Search Report for European Application No. 13852142.2, mailed May 9, 2016.

\* cited by examiner

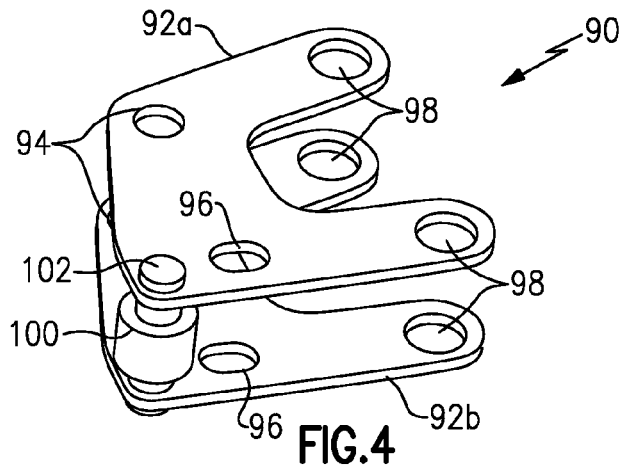
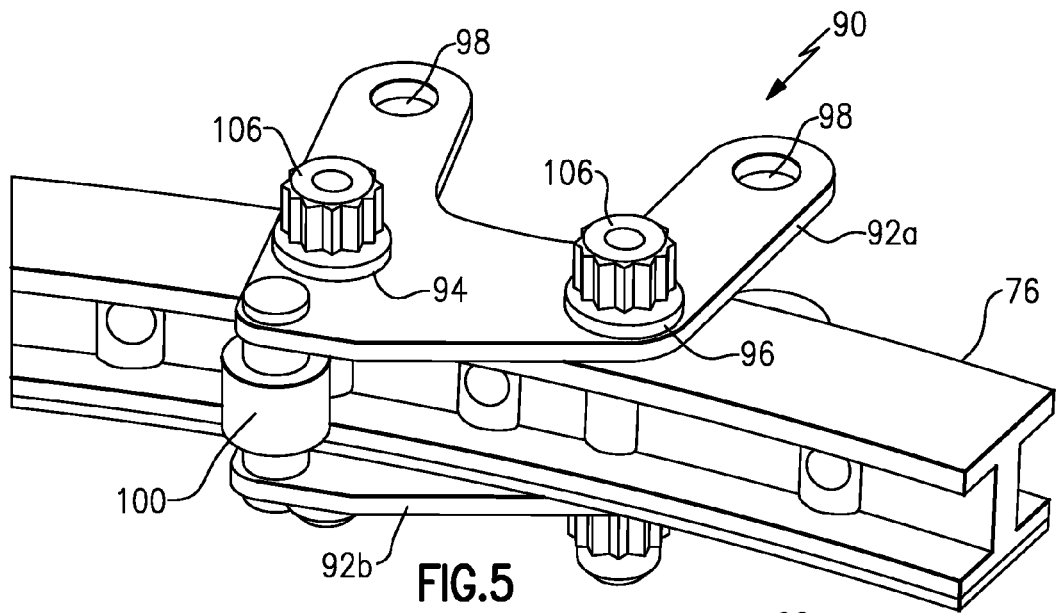
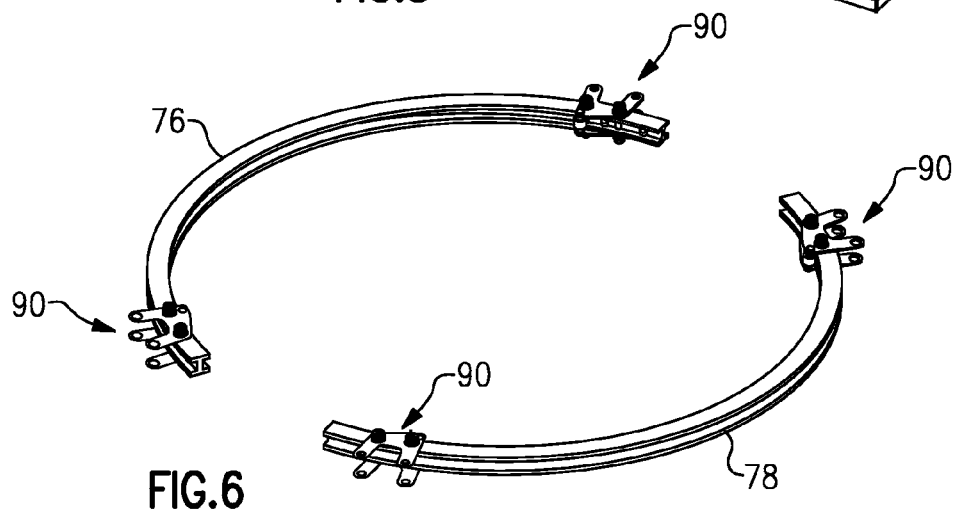

GAS TURBINE ENGINE SYNCHRONIZATION RING

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In general, gas turbine engines include circumferentially spaced vanes forming vane stages that are axially separated from adjacent vane stages by rotor blades. Some gas turbine engines include variable vanes that are rotatable about an axis to vary an angle of the vane to optimize engine performance. In this case, the variable vanes are mechanically connected to a synchronizing ring ("sync-ring") by a vane arm to allow the variable vane to be rotated as the sync-ring is rotated. The sync-ring is rotated by an actuator that is mechanically connected to the sync-ring to vary the angle of the vane. As the sync-ring is rotated in a circumferential direction around the engine, the relative angle of variable vanes at each stage is varied in order to optimize engine performance. During operation of the engine, the sync-ring experiences reaction forces that can elastically deflect the sync-ring out of concentric resulting in vane angle variation between vanes in the same stage. Accordingly, it is desirable to develop improved sync-ring designs to improve operation and engine performance.

SUMMARY

A synchronization ring for a gas turbine engine according to an exemplary aspect of the present disclosure includes, among other things, a synchronization ring for a variable vane assembly. A plurality of rollers are attached to the synchronization ring for engaging a case on the gas turbine engine.

In a further non-limiting embodiment of the foregoing synchronization ring, the synchronization ring includes a plurality of roller brackets for attaching at least one of the plurality of rollers to the synchronization ring.

In a further non-limiting embodiment of either of the foregoing synchronization rings, each of the plurality of roller brackets include a first portion on a first side of the synchronization ring and a second portion on a second opposite side of the synchronization ring.

In a further non-limiting embodiment of any of the foregoing synchronization rings, each of the plurality of roller brackets include at least one cylindrical pivot opening for accepting a pivot fastener and at least one elongated clevis openings for each accepting a fastener, each of the plurality of roller brackets being pivotable about the pivot fastener.

In a further non-limiting embodiment of any of the foregoing synchronization rings, each of the plurality of rollers is supported by a pin that extends between the first portion of the roller bracket and the second portion of the roller bracket.

In a further non-limiting embodiment of any of the foregoing synchronization rings, the synchronization ring includes a first annular member, a second annular member, and at least one clevis.

In a further non-limiting embodiment of any of the foregoing synchronization rings, the first annular member is attached to the at least one clevis by a first roller bracket and the second annular member is attached to the at least one clevis by a second roller bracket.

In a further non-limiting embodiment of any of the foregoing synchronization rings, the first annular member and the second annular member extend a first length and the at least one clevis extends a second length, the first length being greater than the second length.

In a further non-limiting embodiment of any of the foregoing synchronization rings, the plurality of rollers are made of a woven fiber composite.

A gas turbine engine according to an exemplary aspect of the present disclosure includes, among other things, a fan including a plurality of fan blades rotatable about an axis and a compressor section including a plurality of variable compressor vanes. The combustor is in fluid communication with the compressor section. A turbine section is in fluid communication with the combustor. A synchronization ring surrounds the compressor section, the synchronization ring including a plurality of rollers for engaging the compressor section. An actuator is mechanically linked for moving the synchronization ring for varying an angle of the plurality of variable compressor vanes.

In a further non-limiting embodiment of the foregoing gas turbine engine, a plurality of vane arms connect the synchronization ring to each of the plurality of variable compressor vanes.

In a further non-limiting embodiment of either of the foregoing gas turbine engines, a plurality of roller brackets attach at least one of the plurality of rollers to the synchronization ring.

In a further non-limiting embodiment of any of the foregoing gas turbine engines, each of the plurality of roller brackets include a first portion on a first side of the synchronization ring and a second portion on a second opposite side of the synchronization ring.

In a further non-limiting embodiment of any of the foregoing gas turbine engines, the synchronization ring includes a first annular member, a second annular member, and at least one clevis.

In a further non-limiting embodiment of any of the foregoing gas turbine engines, the first annular member is attached to the at least one clevis by a first roller bracket and the second annular member is attached to the at least one clevis by a second roller bracket.

A method of varying a vane angle for a gas turbine engine according to another exemplary aspect of the present disclosure includes, among other things, rotating a synchronization ring including a plurality of rollers and engaging an outer surface of the gas turbine engine with at least one of the plurality of rollers on the synchronization ring.

In a further non-limiting embodiment of the foregoing method of varying a vane angle for a gas turbine engine, a plurality of roller brackets attach at least one of the plurality of rollers to the synchronization ring.

In a further non-limiting embodiment of either of the foregoing methods of varying a vane angle for a gas turbine engine, each of the plurality of roller brackets include a first portion on a first side of the synchronization ring and a second portion on a second opposite side of the synchronization ring.

In a further non-limiting embodiment of any of the foregoing methods of varying a vane angle for a gas turbine engine, the synchronization ring includes a first annular member, a second annular member, and at least one clevis.

In a further non-limiting embodiment of any of the foregoing methods of varying a vane angle for a gas turbine engine, the first annular member is attached to the at least one clevis by a first roller bracket and the second annular member is attached to the at least one clevis by a second roller bracket.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 4 is a perspective view of a roller bracket.

FIG. 5 is a perspective view of a roller bracket mounted to the synchronizing ring.

FIG. 6 is a perspective view of a first synchronizing ring member and a second synchronizing ring member.

DETAILED DESCRIPTION

Figure 1:
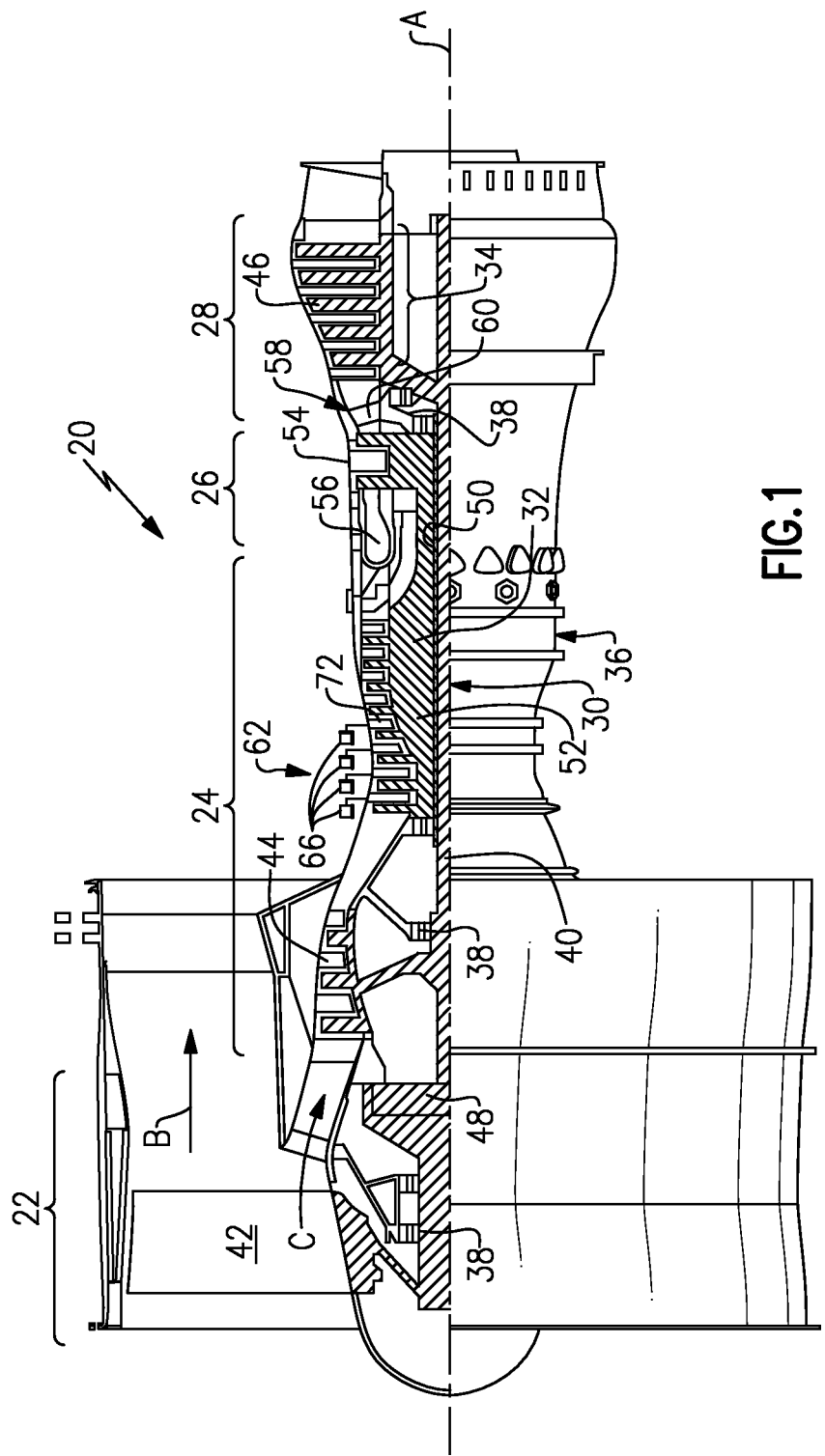
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram \,°\, R)/(518.7°\, R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
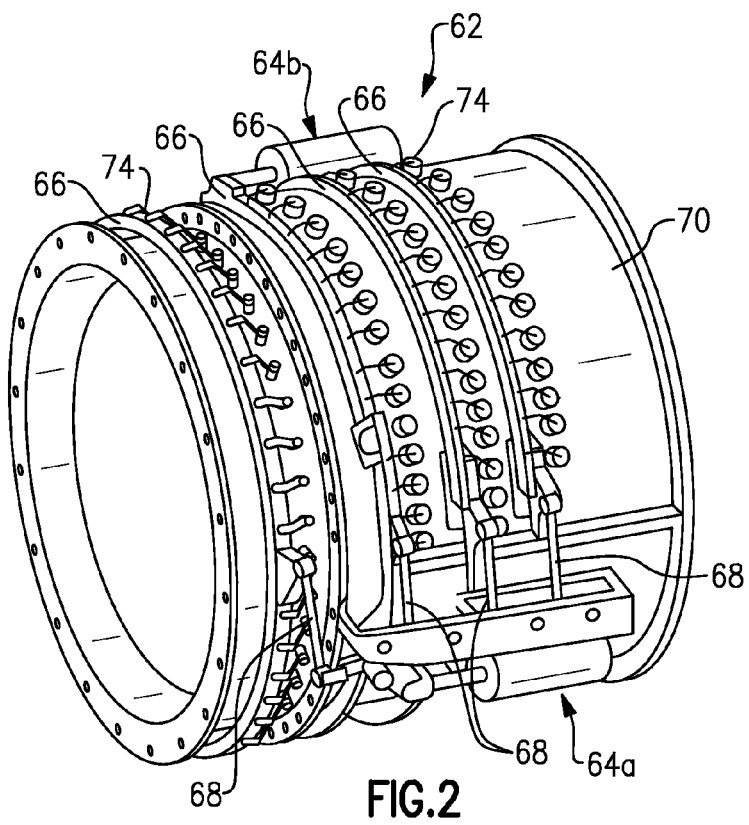
FIG. 2 is a perspective view of a synchronizing ring assembly and actuator.

FIG. 2 illustrates a variable vane assembly 62 that includes a first actuator 64a and a second actuator 64b mechanically linked to each of the synchronization rings 66 via an actuator linkage 68. The first actuator 64a and the second actuator 64b are capable of moving the synchronization rings 66 independently of each other. In this example, each of the synchronization rings 66 engage an outer surface of a high pressure compressor case 70. Variable vanes 72 (FIG. 1) are mechanically linked to the synchronization rings 66 via vane arms 74. A first end of the vane arm 74 is fixedly attached to an end portion of a corresponding variable vane 72 and a second end of the vane arm 74 is rotatably attached to an adjacent synchronization ring 66. Therefore, as the first and second actuators 64a and 64b extend or retract the actuator linkages 68 to rotate the synchronization rings 66 around the compressor case 70, the angularity of the variable vanes 72 are varied to maximize engine performance or efficiency. Although the first and second actuators 64a and 64b are shown in this example, the synchronization rings 66 may be rotated by a single actuator or more than two actuators.

Figure 3:
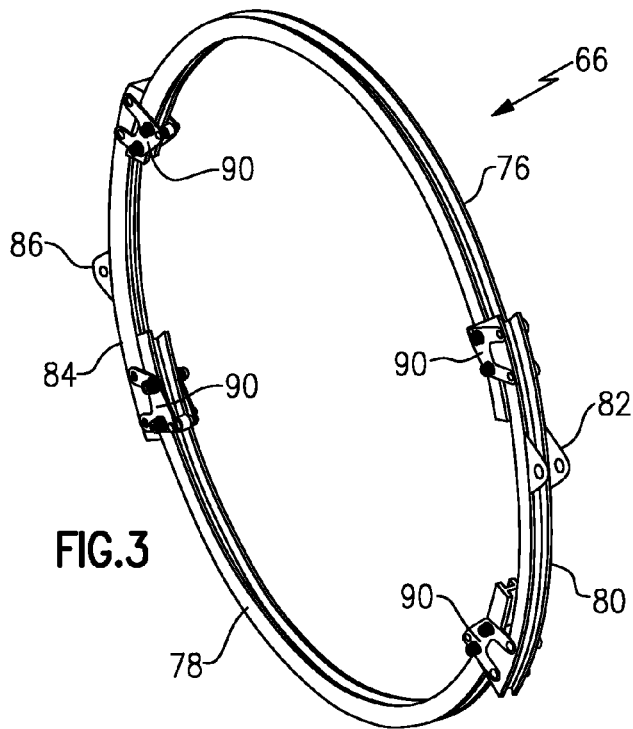
FIG. 3 is a perspective view of the synchronizing rings of FIG. 2.

As shown in FIG. 3, the synchronization ring 66 including a first annular member 76, a second annular member 78, a first clevis 80, and a second clevis 84. The first annular member 76 and the second annular member 78 are substantially similar to each other. Likewise, the first clevis 80 and the second clevis 84 are substantially similar to each other.

A first distal end of the first annular member 76 and a first distal end of the second annular member 78 are connected to the first clevis 80 with example roller brackets 90. A second distal end of the first annular member 76 and a second distal of the second annular member 78 are connected to the second clevis 84 with the example roller brackets 90. In this example, the actuator linkages 68 attach to a first linkage bracket 82 on the first clevis 80 and a second linkage bracket 86 on the second clevis 84.

As shown in FIG. 4, the roller bracket 90 includes a first portion 92a and a second portion 92b. The first and second portions 92a and 92b include pivot openings 94, elongated annular member openings 96, and elongated clevis openings 98. A roller 100 is located on a roller pin 102 that extends between the first portion 92a and the second portion 92b. The roller 100 is made of a woven fiber composite. In one example, the roller 100 is a polyimide and in another example the roller 100 is a dry self-lubricating material. In another example, the roller 100 is metallic with a wear resistant liner.

FIGS. 5 and 6 illustrate the roller bracket 90 attached to distal ends of the first annular member 76 and the second annular member 78. Fasteners 106 extend through the pivot openings 94 and the annular member openings 96 on the roller brackets 90 and corresponding openings on the first annular member 76 and the second annular member 78. The rollers 100 are located radially inward of the first annular member 76 and the second annular member 78 and the clevis openings 98 are located radially outward of the first annular member 76 and the second annular member 78.

Figure 7:
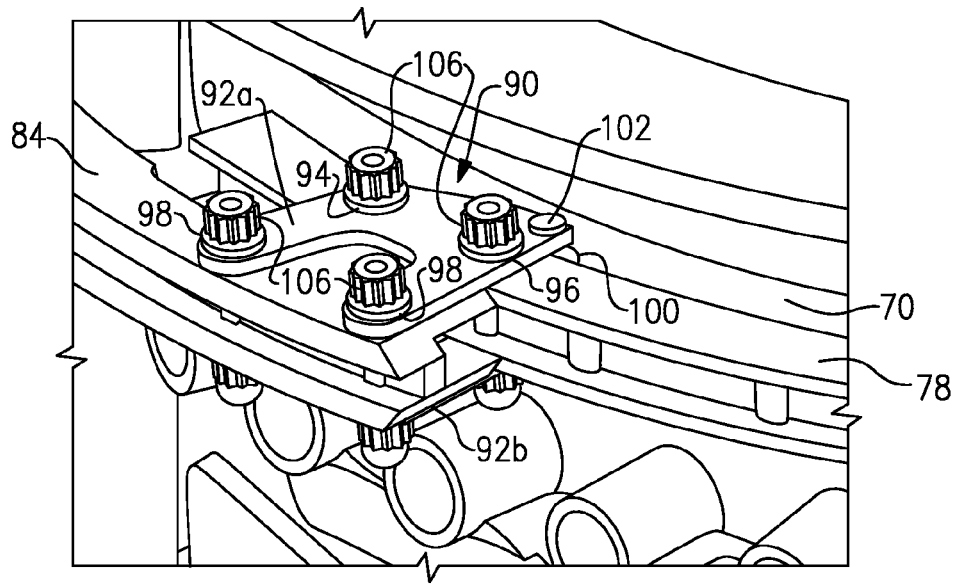
FIG. 7 is a perspective view of the synchronizing ring member and a clevis.

FIG. 7 illustrates an enlarged view of the roller bracket 90 secured to the second clevis 84 and the second annular member 78. The first portion 92a is located on a first side of the second clevis 84 and the second annular member 78 and the second portion 92b is located on a second side of the second clevis 84 and the second annular member 78. The second clevis 84 is located radially outward from the second annular member 78. The roller bracket 90 is secured to the second annular members with fasteners 106 that extend through the pivot openings 94, the annular member openings 96. The roller bracket 90 is secured to the second clevis 84 with fasteners 106 that extend through the clevis openings 98 and the clevis 84.

Since the annular member openings 96 and the clevis openings 98 are elongated, the first clevis 80 and the second annular member 78 are movable relative to each other about the fastener 106 in the pivot openings 94 to vary the amount of force the roller 100 exerts on the compressor case 70. Once the desired amount of force is applied to the compressor case 70 by the roller 100, the fasteners 106 are tightened to prevent additional movement between the second clevis 84 and the second annular member 78. A similar process is followed for the remaining roller bracket connections to ensure proper contact between the rollers 100 and the compressor case 70 to prevent deformation of the synchronization ring 66 and to reduce the force required to rotate the synchronization ring 66 needed to change the angular position of the variable vanes 72.

Figure 8:
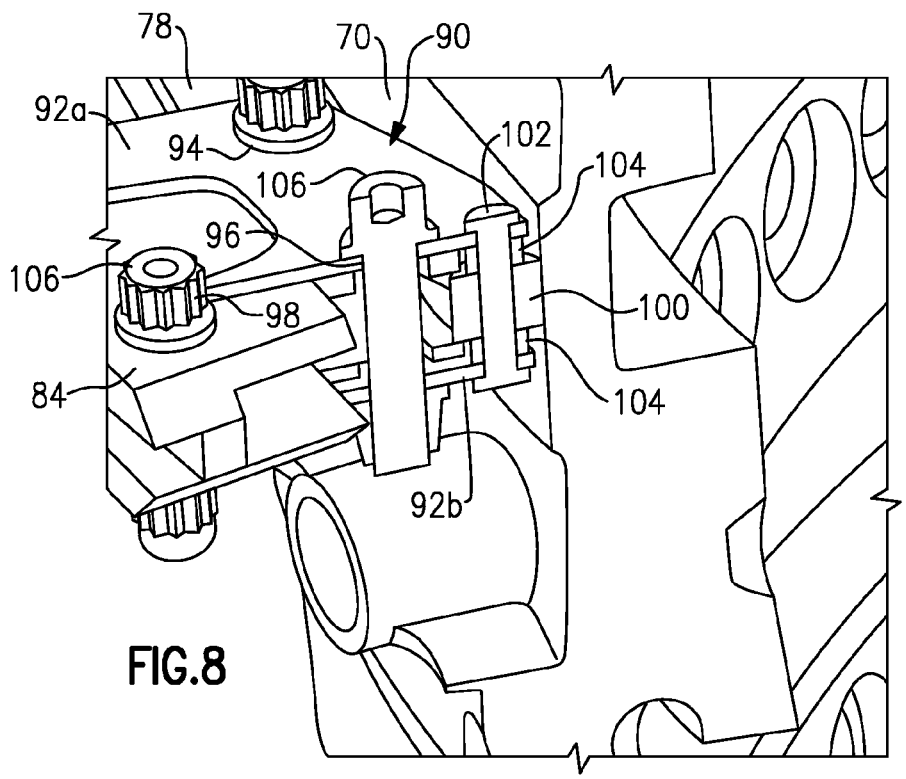
FIG. 8 is a cross-sectional view of the synchronizing ring member and the clevis of FIG. 7.

FIG. 8 is a cross-sectional view of the of the roller bracket connection of FIG. 7. Spacers 104 are located between the roller 100 and the first portion 92a and the second portion 92b to prevent the roller 100 from sliding along the roller pin 102 and also to prevent the roller 100 from engaging the roller bracket 90, the second clevis 84, or the second annular member 78.

Although the disclosed example is described in reference to a high pressure compressor 52, it is within the contemplation of this disclosure that it be utilized with another compressor or turbine section.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:
1. A synchronization ring for a gas turbine engine comprising:
   a synchronization ring for a variable vane assembly including a radially inner side and a radially outer side wherein the synchronization ring includes a first annular member, a second annular member, and at least one clevis and the first annular member is attached to the at least one clevis by a first roller bracket and the second annular member is attached to the at least one clevis by a second roller bracket; and a plurality of rollers attached to the synchronization ring for engaging a case on the gas turbine engine at least one of the plurality of rollers is spaced radially inward from the radially inner side of the synchronization ring.

2. The synchronization ring of claim 1, including a plurality of roller brackets for attaching at least one of the plurality of rollers to the synchronization ring, wherein the plurality of roller brackets include the first roller bracket and the second roller bracket.

3. The synchronization ring of claim 2, wherein each of the plurality of roller brackets include a first portion on a first side of the synchronization ring and a second portion on a second opposite side of the synchronization ring.

4. A synchronization ring for a gas turbine engine comprising:
   a synchronization ring for a variable vane assembly;
   a plurality of rollers attached to the synchronization ring for engaging a case on the gas turbine engine; and
   a plurality of roller brackets for attaching at least one of the plurality of rollers to the synchronization ring, wherein each of the plurality of roller brackets include a first portion on a first side of the synchronization ring and a second portion on a second opposite side of the synchronization ring and each of the plurality of roller brackets include at least one cylindrical pivot opening for accepting a pivot fastener and at least one elongated clevis openings for each accepting a fastener, each of the plurality of roller brackets being pivotable about the pivot fastener.

5. The synchronization ring of claim 3, wherein each of the plurality of rollers is supported by a pin that extends between the first portion of the roller bracket and the second portion of the roller bracket.

6. The synchronization ring of claim 1, wherein the first annular member and the second annular member extend a first length and the at least one clevis extends a second length, the first length being greater than the second length.

7. The synchronization ring of claim 1, wherein the plurality of rollers are made of a woven fiber composite.

8. A gas turbine engine comprising:
   a fan including a plurality of fan blades rotatable about an axis;
   a compressor section including a plurality of variable compressor vanes;
   a combustor in fluid communication with the compressor section;
   a turbine section in fluid communication with the combustor;
   a synchronization ring surrounding the compressor section, the synchronization ring including a plurality of rollers for engaging the compressor section, wherein the synchronization ring includes a first annular member, a second annular member, and at least one clevis and the first annular member is attached to the at least one clevis by a first roller bracket and the second annular member is attached to the at least one clevis by a second roller bracket; and
   an actuator mechanically linked for moving the synchronization ring for varying an angle of the plurality of variable compressor vanes.

9. The gas turbine engine of claim 8, including a plurality of vane arms connecting the synchronization ring to each of the plurality of variable compressor vanes.

10. The gas turbine engine of claim 8, wherein each of the first roller bracket and the second roller bracket include a first portion on a first side of the synchronization ring and a second portion on a second opposite side of the synchronization ring.

11. A method of varying a vane angle for a gas turbine engine comprising:
    rotating a synchronization ring including a plurality of rollers, wherein the synchronization ring includes a first annular member, a second annular member, and at least one clevis and the first annular member is attached to the at least one clevis by a first roller bracket and the second annular member is attached to the at least one clevis by a second roller bracket; and
    engaging an outer surface of the gas turbine engine with at least one of the plurality of rollers on the synchronization ring.

12. The method of claim 11, wherein each of the first roller bracket and the second roller bracket each include a first portion on a first side of the synchronization ring and a second portion on a second opposite side of the synchronization ring.

13. The gas turbine engine of claim 8, wherein the synchronization ring includes a radially inner side and a radially outer side and at least one of the plurality of rollers is spaced radially inward of the radially inner side of the synchronization ring.

14. The method of claim 11, wherein the synchronization ring includes a radially inner side and a radially outer side and at least one of the plurality of rollers is spaced radially inward of the radially inner side of the synchronization ring.

15. The gas turbine engine of claim 8, wherein each of the first roller bracket and the second roller bracket include a first portion on a first side of the synchronization ring and a second portion on a second opposite side of the synchronization ring and each of the first roller bracket and the second roller bracket include at least one cylindrical pivot opening for accepting a pivot fastener and at least one elongated clevis openings for each accepting a fastener, each of the first roller bracket and the second roller bracket being pivotable about the pivot fastener.

16. The method of claim 12, wherein at least one of the first roller bracket and the second roller bracket include at least one cylindrical pivot opening for accepting a pivot fastener and at least one elongated clevis openings for each accepting a fastener, each of the first roller bracket and the second roller bracket being pivotable about the pivot fastener.

* * * * *